(12) United States Patent
Helbling (10) Patent No.: US 9,979,246 B2
(45) Date of Patent: May 22, 2018

(54) ELECTRIC MOTOR COMPRISING AN INTERNAL ROTOR AND AN EXTERNAL STATOR

(71) Applicant: EBM-PAPST ST. GEORGEN GMBH & CO. KG, St. Georgen (DE)

(72) Inventor: Sergej Helbling, Villingen-Schwenningen (DE)

(73) Assignee: EMB-PAPST ST. GEORGEN GmbH & CO. KG., St. Georgen (DE)

(*) Notice: Subject to any disclaimer, the term of this patent is extended or adjusted under 35 U.S.C. 154(b) by 249 days.

(21) Appl. No.: 14/778,911

(22) PCT Filed: Mar. 19, 2014

(86) PCT No.: PCT/EP2014/055465
§ 371 (c)(1),
(2) Date: Sep. 21, 2015

(87) PCT Pub. No.: WO2014/147102
PCT Pub. Date: Sep. 25, 2014

(65) Prior Publication Data
US 2016/0049837 A1  Feb. 18, 2016

(30) Foreign Application Priority Data
Mar. 19, 2013  (DE) .................. 10 2013 102 822

(51) Int. Cl.
H02K 1/30 (2006.01)
H02K 1/27 (2006.01)
H02K 29/03 (2006.01)

(52) U.S. Cl.
CPC ............. H02K 1/30 (2013.01); H02K 1/276 (2013.01); H02K 29/03 (2013.01)

(58) Field of Classification Search
CPC .......................................... H02K 1/27–1/2793
(Continued)

(56) References Cited

U.S. PATENT DOCUMENTS 8,569,922 B2  10/2013  Rombach .................. 310/156.63
9,484,792 B2  11/2016  Utsumi ..................... 310/156.53
(Continued)

FOREIGN PATENT DOCUMENTS

CN  1029-48041  12/2011
CN  102810919  12/2012
(Continued)

OTHER PUBLICATIONS

Finite Element Method, Wikipedia, 11 pp, retrieved Sep. 20, 2015.
J-Plat-Pat, Translation of JP 5,436,525-B.

Primary Examiner — Thomas Truong
(74) Attorney, Agent, or Firm — Milton Oliver; Oliver Intellectual Property (57) ABSTRACT

An electric motor (100) features a external stator (28), an internal rotor (150) rotatably mounted within the external stator, the rotor having a lamination stack (200, 200', 200") composed of a plurality of rotor plates (201, 201', 201") in which are formed at least one first recess (614) and at least one second recess (630), a rotor magnet (224) being located in each first recess (614), the second recess (630) being associated with a jamming element (40) mounted therein. A clamping member (692,694) is arranged between the first recess (614) and the second recess (630). The clamping member and the second recess (630) are shaped so as to enable support of the jamming element (40) on the lamination stack, and to permit application of a force (F) on the clamping member in the direction of the rotor magnet. The second recess (630) serves as a through-opening for receiving a shaft (40), and the shaft (40) serves as the jamming element (40).

24 Claims, 9 Drawing Sheets (58) Field of Classification Search
USPC ............ 310/156.53, 156.56, 156.08, 156.16,
310/156.72–156.77
IPC ................................................ H02K 1/27,1/30
See application file for complete search history.

(56) References Cited

U.S. PATENT DOCUMENTS

| | | | |
|---|---|---|---|
| 2006/0022541 A1* | 2/2006 | Ong ...................... | H02K 7/003 310/156.53 |
| 2006/0138894 A1* | 6/2006 | Harada .................... | H02K 1/28 310/216.004 |
| 2010/0187944 A1 | 7/2010 | Ossenkopp ............ | 310/216.049 |
| 2011/0121668 A1* | 5/2011 | Condamin ........... | H02K 1/2773 310/51 |
| 2013/0002082 A1* | 1/2013 | Utsumi .................. | H02K 1/276 310/156.53 |
| 2013/0020897 A1* | 1/2013 | Takizawa ............... | H02K 1/276 310/156.01 |

FOREIGN PATENT DOCUMENTS

| | | |
|---|---|---|
| DE | 102007-029719 | 8/2008 |
| DE | 102011-101730 | 12/2011 |
| EP | 2715917 B | 12/2012 |
| JP | 2012-050331 A | 3/2012 |
| WO | WO 2008/092748 A | 8/2008 |
| WO | WO 2011-160872 | 12/2011 |

* cited by examiner

ELECTRIC MOTOR COMPRISING AN INTERNAL ROTOR AND AN EXTERNAL STATOR

CROSS-REFERENCE TO RELATED APPLICATIONS

This application is a section 371 of PCT/EP2014/055465 filed 2014 Mar. 19, and further claims priority from my German application 10 2013 102 822.5 filed 2013 Mar. 19, the contents of which is hereby incorporated by reference.

FIELD OF THE INVENTION

The invention relates to an electric motor configured with an internal stator and an external stator, and to an internal rotor with permanent magnets, arranged rotatably, inside the external stator.

BACKGROUND

Due to the low axial moment of inertia of such internal rotor motors, they are often used for drive applications, in which the movements of the electric motor must respond very rapidly to electrical commands, e.g. servo motors. In such a motor, the permanent magnets of the internal stator, which are arranged in a lamination stack associated with the internal rotor, cannot rattle or chatter, and must not, even at high rotation speeds, axially displace, i.e. they must be securely fixed, in the axial and radial directions, within the lamination stack. In the automotive industry, for example, in extreme installation contexts, it is required that the magnets must remain secure in the rotor, despite being subjected to an acceleration of 50 grams. With this objective, one can glue the permanent magnets in the lamination stack, or one can fasten, at both ends of the lamination stack, a securing disk which covers the magnets. One can also overmold the lamination stack with plastic, but all of these methods involve additional working steps, time, and supplemental materials. For gluing, special working stations with fume exhausting, etc. are necessary.

DE 10 2011 101 730 A1, and corresponding U.S. Pat. No. 8,569,922, ROMBACH, disclose an internal rotor motor, in which the permanent magnets are elastically clamped within the associated lamination stack. This is achieved by the fact that, using a tool, lugs arranged at the outer circumference of the lamination stack are pressed radially inward (in-dented, crimped). Thus, one obtains springy indented elements (indentations, crimpings) which each exert an radially inwardly directed force F in the direction of a respective pocket or recess, in which a permanent magnet of the internal rotor is placed, so that the magnet is clamped within the pocket.

A disadvantage is that these springy indented elements (indentations, crimpings), over the service life of the internal rotor motor, can rebound, allowing the permanent magnets to work loose, and thus rattle, or fall out of the pockets.

DE 10 2007 029 719 A, and corresponding WO 2008/092748-A, ROTH et al, disclose an internal rotor motor in which, at respective recesses of a lamination stack associated with the internal rotor, a resilient lug is provided which, in a load-free state resiliently engages in a corresponding recess. This resilient lug, upon insertion of a respective permanent magnet into the recess, is subjected to a force and thereby elastically deforms. Thus, after the insertion of the permanent magnet into the recess, the resilient lug exerts a respective force F against the permanent magnet, which keeps the magnet in the recess. It is nevertheless possible that, over the service life of the internal rotor motor, these resilient lugs may rebound, so that the permanent magnets, despite the use of these resilient lugs, can get loose and thus rattle, or fall out of the recesses.

SUMMARY OF THE INVENTION

It is therefore an object of the present invention to provide a new electric motor with an internal rotor, in which permanent magnets, for actuation of the internal rotor, can be axially and radially fixed in position. This object is achieved by the structure described below.

The figures and the description disclose an electric motor, having: an external stator, an internal rotor rotatably arranged in the external stator and having a lamination stack composed of a plurality of plates and in which at least one first recess and at least one second recess are provided, the first recess having a respective permanent magnet arranged therein and the second recess having a respective jamming or wedging element arranged therein. Between the first recess and the second recess, a clamping member is provided. The jamming or wedging element and the second recess are so configured that support of the jamming element on the lamination stack is possible and the clamping member is subjected to a force in the direction toward the rotor magnets, in order to thereby clamp the rotor magnets into the first pockets; the lamination stack is formed with a through-passage for receiving a shaft; and the jamming or wedging element is constituted by the shaft.

In this manner, the wedging of the shaft with the aid of a clamping member is enabled. Through the use of the shaft as the jamming element, it becomes unnecessary to have any supplemental component as a jamming element.

According to an advantageous embodiment, the clamping member is formed as a component of the lamination stack. This facilitates an advantageous assembly process and a stable construction.

According to a preferred embodiment, the clamping member is configured with a bar shape. In this manner, displacement of the clamping member, relative to the remainder of the lamination stack, is simplified.

According to a preferred embodiment, the clamping member is so shaped that a radially outwardly directed displacement of the clamping member by through the jamming or clamping element is made possible. Thereby, the rotor magnet is pressed outward and clamped. When the shaft is employed as the jamming element, this is more effective than a sidewise clamping.

According to a preferred embodiment, the rotor magnet has a radially inner side or surface and the clamping member is so configured that the rotor magnet in the first pocket is clamped only in a portion of this inner surface. This minimizes the danger of damaging the rotor magnet.

According to a preferred embodiment, the jamming element is composed of a harder material than the lamination stack. This facilitates the pressing-in or shoving-in of the jamming element, since during pressing, the leading portion can be strongly stressed.

According to a preferred embodiment, the jamming element has a chamfer or taper, in order to facilitate insertion into the second recess.

According to a preferred embodiment, the jamming element is form-lockingly engaged with the second recess, at least in a dimension perpendicular to the rotation axis. This means that the jamming element cannot move in the radial direction, and supports the jamming function in all directions.

According to a preferred embodiment, the clamping member has a projection oriented toward the second recess, which projection is subjected to a force from the jamming element, directed toward the rotor magnets.

According to a preferred embodiment, the projection of the clamping member extends into the second recess of the lamination stack, in order to work together with the jamming element.

According to a preferred embodiment, the clamping member extends from the second recess to the first recess, in order to improve force transfer between the jamming element and the rotor magnets.

According to a preferred embodiment, on at least one predetermined rotor plate of the lamination stack, for formation of the clamping member, a first cutout is provided on a first side, and a second cutout is provided on a second side opposite the first side. This supports, during assembly, a movement of the clamping member toward the rotor magnets, i.e. a movement relative to the other parts of the rotor plate, and, after assembly, a desired transmission of force from the jamming element to the rotor magnets.

According to a preferred embodiment, the first and second cutouts run, at least in part, parallel to each other. Due to the parallel configuration, a radial displacement of the clamping member is enabled simply.

According to a preferred embodiment, the first and the second cutouts each extend, at least in part, radially. Even with a radial course, a radially outward displacement of the clamping member is fundamentally possible, and the radial course enable the arrangement of the first and second cutouts in an angular sector between two adjacent first pockets for the rotor magnets, i.e. a double utilization of the first and the second cutouts.

According to a preferred embodiment, the first and second cutouts extend in a curved manner such that, from a region between the first and second recesses, and both toward the first recess and toward the second recess, the cutouts approach each other. Thereby, a stable middle region is created at the clamping member, and the outward force is transmitted via a smaller region, which increases the pressure.

According to a preferred embodiment, the first and second cutouts are each T-shaped. This supports, on one hand, a limitation of force during the force transmission via the clamping member, and, on the other hand, the clamping member can, in the course of a radial outward movement, be moved into the leg or bight of the T-shaped cutout, since the leg or bight provides space therefor.

According to a preferred embodiment, the radially outer portion of the first cutout, and the radially outer portion of the second cutout, each feature two leg- or bight-shaped regions.

According to a preferred embodiment, the leg- or bight-shaped regions each have a curved contour, in order, during deformation of the rotor plate, to better distribute the stresses.

According to a preferred embodiment, the leg-shaped regions extend out from the middle with a curvature, so that the ends are angled out, with respect to a hypothetical tangent line perpendicular to a line through the middle of the cutout. Thereby, the pressure on the rotor magnets is positively influenced.

According to a preferred embodiment, the first and second cutouts transition directly into the through-passage for the shaft. Thereby, a radially outward movement of the clamping member in this region is not hindered.

According to a preferred embodiment, the first and second cutouts are provided midway between two adjacent clamping members, in order to form both clamping members.

According to a third embodiment, a third cutout is provided, which extends inwardly from the first recess. This reduces tangential forces which arise during an outward movement of the clamping member.

According to a preferred embodiment, the third cutout forms, adjacent the first cutout, two legs, each arranged on a respective side of the third cutout, the two legs preferably joining each other in a region on the radially inner side. The two legs can thus press on the rotor magnet, partly decoupled from each other.

According to a preferred embodiment, the third cutout has a first portion which is elongated, and extends from the first recess in a radially inward direction. This leaves remaining a lot of material for the clamping member, and leads to a subdivision in this region.

According to a preferred embodiment, the third cutout has, at an inner end of the first portion, a second portion which is widened by comparison to the first portion. In this way, stresses, which can arise in the clamping member near the second portion, are better distributed.

According to a preferred embodiment, the second portion has a round shape. In this way, stresses, which can arise in the clamping member adjacent the second portion, are better distributed.

According to a preferred embodiment, the maximum outward extent of the first cutout has a first spacing from the rotation axis, the maximum outward extent of the second cutout has a second spacing from the rotation axis, and the maximum inward radial extent of the third cutout has a third spacing from the rotation axis. The first spacing from the rotation axis and the second spacing from the rotation axis are each greater than the third spacing from the rotation axis. This supports the cooperative effect of the first, second and third cutouts.

According to a preferred embodiment, a clamping member is provided, in which the first cutout, the second cutout and the third cutout are together formed mirror symmetrically with respect to a first axis of symmetry which extends in a radial direction centrally through the third cutout. Thereby, forces are evenly distributed.

According to a preferred embodiment, the first cutout is configured mirror-symmetrically to a second axis of symmetry, which runs in a radial direction centrally through the first cutout. This supports an even distribution of forces, when the first cutout serves to define two adjacent clamping members.

According to a preferred embodiment, the rotor plate has a meandering course between the first recess and the second recess. This facilitates good movement of the clamping member; nevertheless, the rotor plate is stable.

According to a preferred embodiment, the clamping member is connected, at its end adjacent the first recess, via a bridge with the remaining portions of the associated rotor plate, and the first or the second cutout has, near the bridge, an angled-away region. The bridge leads to good stability of the rotor plate, and the angled-away region enables a relative movement of the clamping member in the angled-away region.

According to a preferred embodiment, the clamping member is connected, at its end adjacent the second recess, via a bridge to remaining portions of the associated rotor plate and the first cutout or the second cutout has, adjacent this bridge, at least one angled-away region. The bridge results in good stability of the rotor plate and the angled-away region enables a relative movement of the clamping member into the angled-away region.

According to a preferred embodiment, the electric motor has a predetermined rotor plate with a plurality N of first recesses for reception of a plurality N of rotor magnets, and the rotor plate has a number K of clamping members, where N=K. Since, for each rotor magnet, a clamping member is provided, the rotor plate can be oriented in each position. This simplifies assembly, and makes possible a lamination stack with only one rotor plate which has clamping members.

According to a preferred embodiment, the electric motor has two predetermined rotor plates which are each provided with a plurality N of first recesses for reception of a plurality N of rotor magnets, and there are provided a plurality K of clamping members, where N is greater than 1, and K has a value which falls in the range from 1 to N−1. Thereby, the clamping force on the individual rotor magnets is increased, since the clamping members can be made larger, particularly in the inner region.

According to a preferred embodiment, the electric motor has at least one first rotor plate with a clamping member. On at least one side of the first rotor plate, preferably on both sides of the first rotor plate, at least a further rotor plate is provided. This increases stability, since any movement in an axial direction is hindered by the presence of the neighboring rotor plate.

BRIEF FIGURE DESCRIPTION

Further details and advantageous refinements of the invention will be apparent from the embodiments described below and shown in the drawings, which in no way are to be construed as limitations of the invention. Shown are.

DETAILED DESCRIPTION

In the following description, the expressions "left," "right," "top" and "bottom" refer to the respective drawing figure and can vary, depending upon a respectively selected orientation (portrait or landscape), from one figure to another. Identical or functionally-equivalent parts in the various figures are designated with the same reference numerals, and are generally described only once. For better understanding, the rotor laminations are partly represented by small dots and/or with surface shading.

Basic Structure of an Internal Rotor Motor

Figure 1:
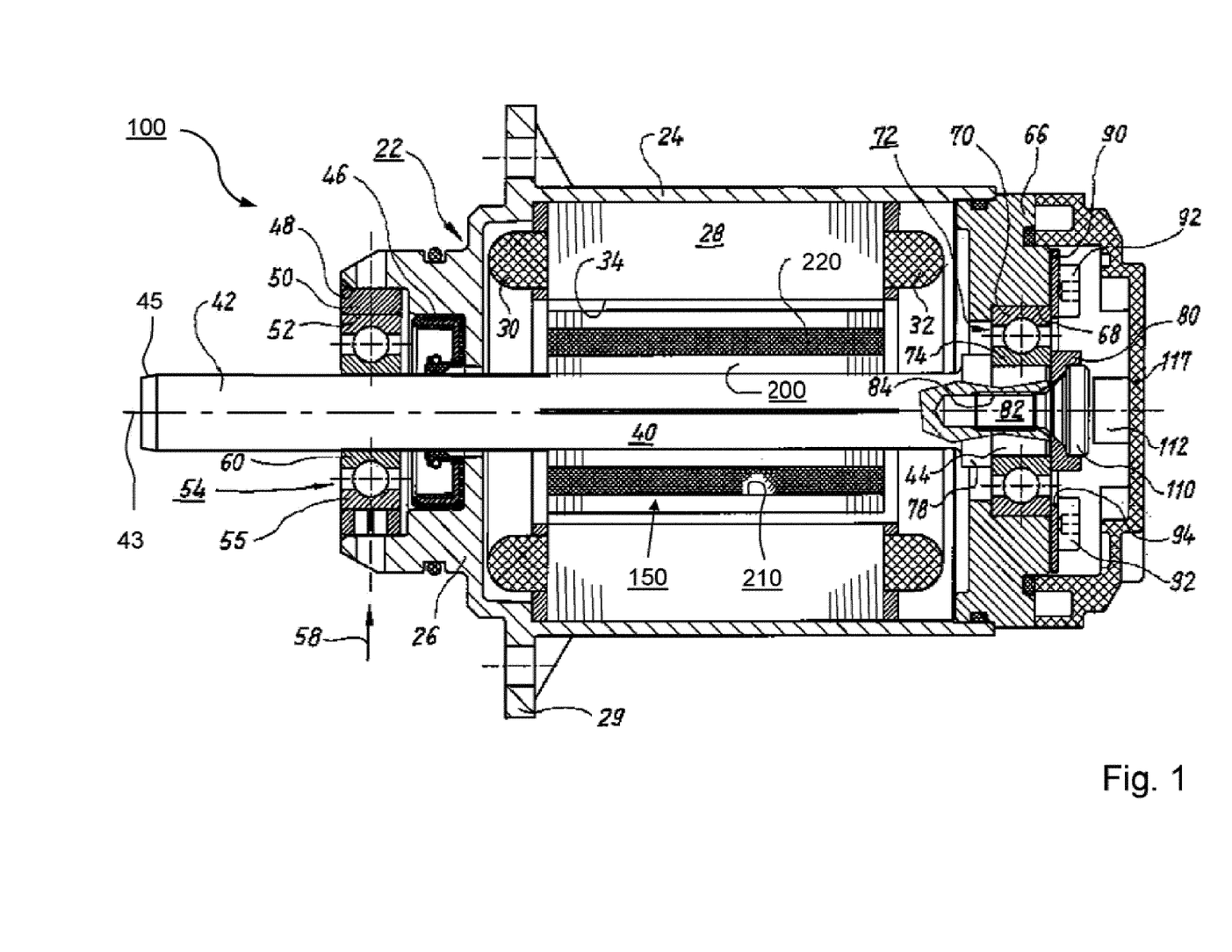
FIG. 1 a section through an electric motor according to the invention, having an internal rotor and an external stator.

FIG. 1 shows an electric motor 100 equipped with a housing 22. The motor is preferably configured as an electronically commutated internal rotor motor. It includes an external stator 28 arranged in housing 22, as well as an internal rotor 150 mounted for rotation within the external stator 28. The rotor is separated from external stator 28 by a magnetically effective air gap 39.

Housing 22 has, for example, a cylindrical housing portion 24, an A-side shield or plate 26, and a securing flange 29. In the cylindrical housing portion 24, a lamination stack 27 of the external stator 28 is arranged, and its winding ends are designated with reference numerals 30 and 32. The lamination stack 27, for better understanding of the description, will hereinafter be referred to as the "stator stack." This stator stack can be embedded in a winding or insulated body 25, which for example can be formed using plastic injection molding.

Further, the external stator 28 has an interior recess 34, in which is arranged a lamination stack 200 of the internal rotor 150, equipped with at least one, and preferably a plurality (e.g. 2, 4, 6, 8) of rotor magnets 220. This lamination stack 200, which can also be called a "rotor stack" has at least one and preferably a plurality of pockets for receiving the rotor magnets 220, in which pockets the rotor magnets are arranged. According to one embodiment, these are permanent magnets.

Rotor stack 200 is arranged on a rotor shaft 40, which preferably is press-fitted into rotor stack 200. The rotor shaft 40 has a free, outer, drive end 42 and an inner shaft end 44, and is adapted for rotation about a rotation axis 43. At one end 42 of the rotor shaft 40, there is a chamfer or taper 45.

For the rotor shaft 40, in A-side shield 26, a seal 46 is provided. In this area, a recess 48 is formed, in which is secured a guide element 50 for an outer race 55 of a rotary bearing 54. An inner race 60 of this rotary bearing 54 is arranged about the rotor shaft 40, adjacent the drive end 42, preferably press-fitted.

The inner shaft end 44 of rotor shaft 40 is arranged in a B-side shield 66 which is secured to an open end of cylindrical housing portion 24, which end is near the A-side shield 26. The B-side shield 66 has a cavity 68, formed with an annular shoulder, for receiving an outer race 70 of a rotary bearing 72, whose inner race 74 is secured on shaft end 44. The rotor shaft 40 has an annular collar 78, with which it abuts a side (in FIG. 1, the left side) of the inner race 74. Against this race's other (in FIG. 1, right) side rests a casting 80 (composed of, e.g. brass) having a generally annular shape and which is pressed in a direction toward the rotor shaft 40 by the screwhead 110 of a countersunk screw 82. Countersunk screw 82 is threaded into an internal thread 84 of shaft end 44 and thereby urges casting 80 in the direction of inner race 74. Reliable biasing of outer race 70 of rotary bearing 72 is achieved by a preferably flat, annular part 90 which is secured at its outer periphery to B-side shield 66 by multiple, evenly distributed screws 92, e.g. three screws 92; with its radially inner periphery 94, it abuts against outer race 70 and presses it (in FIG. 1, toward the left) against shoulder 78.

In the screwhead 110, a control magnet is preferably secured. This is equipped with a magnetization pattern on, for example, its right side (as seen in FIG. 1), which serves for actuation of magnetoresistive resistors 112, arranged on a housing cover 117 and serving for detection of a respective rotational position of internal rotor 150, in order to enable exact control of the form and commutation of motor currents in external stator 28. The housing cover 117 is secured on the B-side shield 55 and preferably serves for sealing closure of housing 22.

It should be mentioned that the above-described electric motor can be termed not only an "electronically commutated internal rotor motor" but can be described with other terms, e.g. electric motor can also be called a "permanently excited synchronous internal rotor machine, or an "electronically commutated motor" or an "electric motor with permanent magnetic excitation."

Rotor Packet with Clamping Members & Rotor Shaft as Clamping Element

Figure 2:
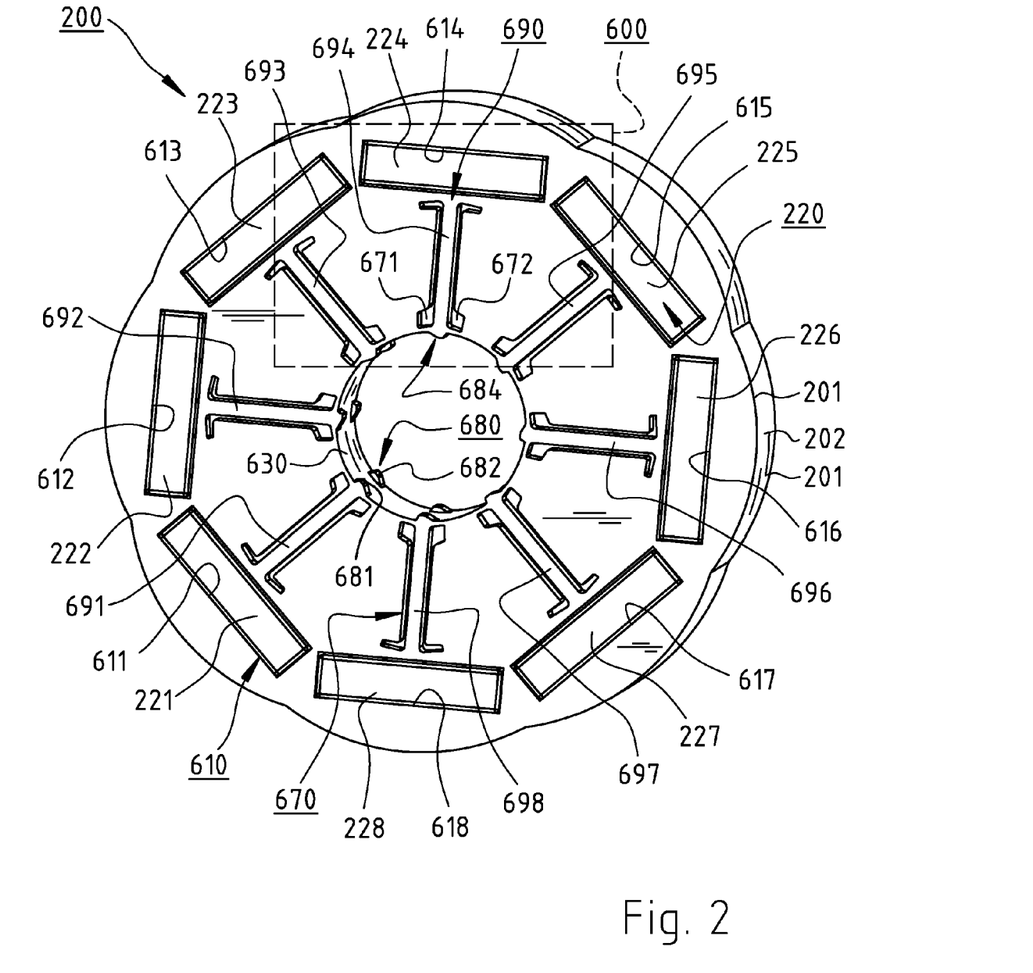
FIG. 2 a perspective view of a lamination stack according to a first embodiment, with associated rotor magnets.

FIG. 2 shows a lamination stack 200 according to a first embodiment, which can be used to implement the electric motor 100 of FIG. 1. Lamination stack 200 has laminations or "rotor plates" 201 which are configured to press the rotor magnets 220 of FIG. 1 outwardly against lamination stack 200 and thereby to secure them, and the laminations 202, which do not have such a pressing-outward function, serve as an engagement surface for the rotor magnets 220 urged outward by a force. The rotor laminations can also be called "sheet metal laminations."

The lamination stack 220 is formed with a longitudinal passage 630 for receiving the rotor shaft 40 shown in FIG. 1 and has a plurality of pockets 610 for receiving a plurality of rotor magnets 220 of FIG. 1 (top). Illustratively, the plurality of pockets 610 can be eight pockets 611, 612, 613, 614, 615, 616, 617, 618. In this context, one of the rotor magnets 221, 222, 223, 224, 225, 226, 227, 228 is placed in a respective pocket of the plurality of pockets 611, 612, 613, 614, 615, 616, 617, 618; for example, rotor magnet 224 is placed in pocket 614, and so forth. The longitudinal passage 630 can also be called a central opening 630 or a recess 630.

To the plurality of pockets 610, there is a corresponding plurality of (preferably bar-shaped) clamping members 690. Advantageously, to each of the pockets 611, 612, 613, 614, 615, 616, 617, 618, there is a corresponding clamping member 691, 692, 693, 694, 695, 696, 697, 698. Adjacent to at least one, and preferably each, of the plurality of clamping members 690 are oppositely located, preferably radially extending channels 670 which surround the plurality of clamping members 690, while they enable relative movement of the clamping members 690 with respect to the remaining portion of the rotor stack. For simplicity, and easier comprehension of the drawing, only the channels surrounding the clamping member 694 are designated as 671, 672.

The channels 671, 672 are preferably so formed that the clamping member 694 extends from the longitudinal passage 630 to the pocket 614. The remaining channels of the plurality of channels 670 are preferably similarly shaped, as is apparent from FIG. 2.

According to a first embodiment, on lamination stack 200, a plurality of projections or bosses 680 are formed, which extend the plurality of clamping members 690 into the longitudinal passage 630. Illustratively, adjacent each of the plurality of clamping members 691 through 698, there are provided two projections which extend into through-passage 630, of which, for reasons of simplicity and ease of interpretation, are shown only projections 681, 682 (on clamping member 691) and projection 684 (on clamping member 694). The plurality of projections 681, 682 can be formed by one or more rotor plates 201 (cf. FIG. 3). In the present example, the first and last rotor plates, respectively, are adapted to securely clamp the rotor magnets and have the projections 681, 682, while the intermediate rotor plates 202 do not have them.

Figure 3:
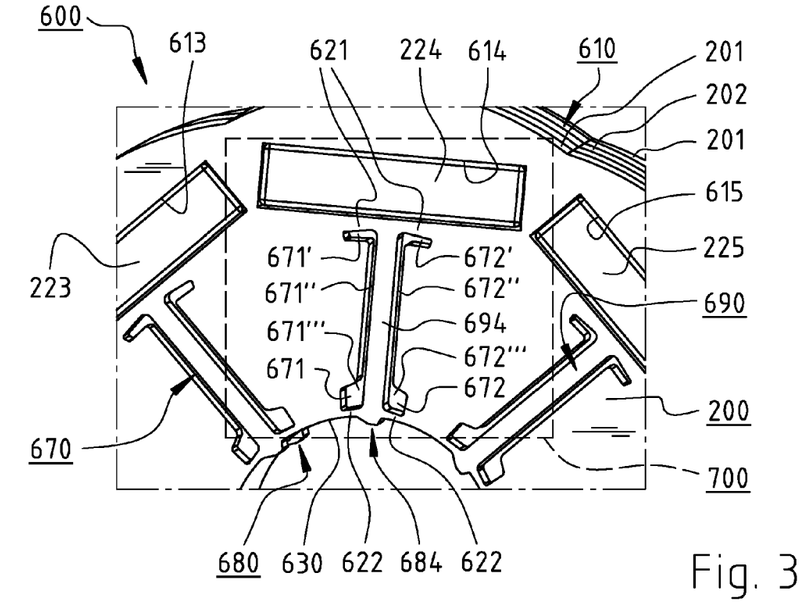
FIG. 3 an enlarged view of a detail 600 from FIG. 2.

FIG. 3 shows an enlarged detail 600 of the lamination stack 200 of FIG. 2, which illustratively has a plurality of stacked rotor plates 201, in which the plurality of recesses or pockets 610, the through-passage 630 and the plurality of cutouts 670 of FIG. 2 are, for example, stamped out or cut using a laser. The rotor plates 201, 202 for creation of the lamination stack 200 can be secured to each other in any suitable manner, e.g via welding or stamping. This is also called "stamp packeting" in which, after each addition of a rotor plate, a stamp forms an engaging knub or boss 206, and thereby forms a connection. For example, the knubs 206 can have a depth of about half the thickness of the rotor plate.

Alternatively, instead of the plurality of assembled rotor plates 601, 602, one can employ soft iron or other weakly magnetic material for implementation of the lamination stack. One thus speaks generally of a "rotor core" or "rotor packet."

The enlarged detail 600 elucidates, particularly, the respective rotor magnets 224 arranged in the pockets 614 and the openings 671, 672 located in the region between the pocket 614 and the through-passage 630. These form, as shown in FIG. 2, the clamping member 694, on which the projection 684 extending into the through-passage 630 is provided. This is subject to forces applied by the associated jamming element in the direction of pocket 614, as described below with reference to FIGS. 4 & 5.

Clamping element 694, which advantageously extends from the through-passage 630 to the recess 614, is preferably surrounded on both sides by channels 671, 672 over at least 70% of its extent. They have a middle section 671", 672".

Preferably, the clamping member has a first end, adjacent pocket 614, connected via at least one crossbar 621 to the corresponding rotor plate 201 and a second end, adjacent through-passage 630, connected via at least one crossbar 622 to the corresponding rotor plate 201, in order to preferably oppose a deformation of the clamping member in the axial direction and in the circumferential direction.

Preferably, the crossbar 621 is so formed that the cutouts 671, 672 have, adjacent crossbar 621, a bent-over region 671', 672' and, in this region, the cutouts diverge from each other. This facilitates a better movement of clamping member 694 in the direction of rotor magnets 224.

Preferably, the crossbar 622 is so formed that the cutouts 671, 672 have, adjacent crossbar 622, a bent-over region 671", 672" and, in this region, the cutouts diverge from each other. This facilitates a better movement of clamping member 694 in the direction of rotor magnets 224, and crossbar 622 does not get displaced onto the adjacent region, which would lead to a collision and would hinder further movement of the clamping member 694.

Preferably, the clamping member 694 has, at least in regions, a consistent thickness perpendicular to its length. In order to achieve this, the cutouts 671, 672 run parallel to each other, at least on the side adjacent the Clamping member 694.

The cutouts 671, 672 define, preferably adjacent the projection 684, a region 672", in which, during a movement toward the rotor magnets 224, the projection 684 can be pressed inward.

Figure 4:
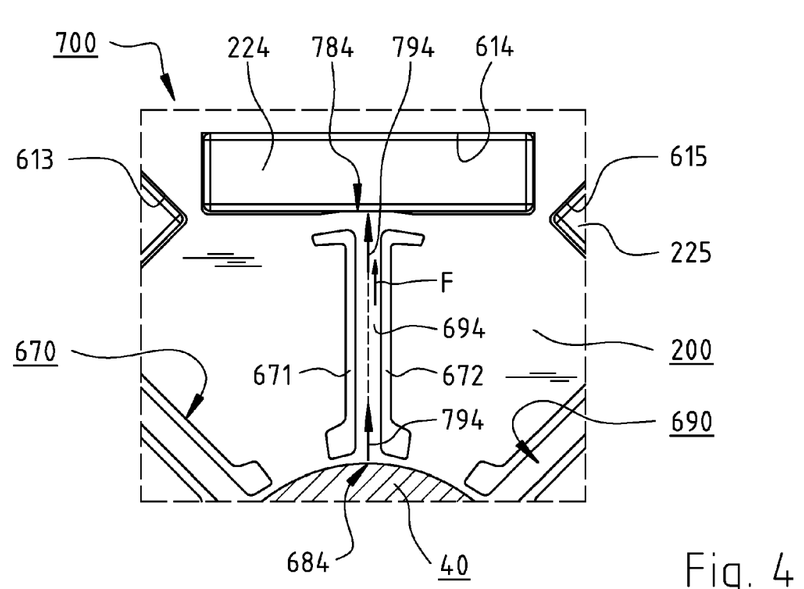
FIG. 4 an enlarged view of a detail 700 from FIG. 3, with a jamming element secured to the lamination stack.

FIG. 4 is an enlarged view of a portion 700 of FIG. 4, with the rotor magnets 224, which are clamped into the recess 614 by the clamping member 684. FIG. 4 illustrates a jamming or extruding element, pressed into the through-passage 630, which according to a first embodiment, comprises a rotor shaft associated with lamination stack 200, for example the rotor shaft 40 of FIG. 1, associated with the internal rotor 150 of FIG. 1.

Due to this insertion, the jamming element or the rotor shaft 40 is secured in a stable way within the through-passage 630, so that the projection 684 is permanently subjected to force in the longitudinal direction of the clamping member 694. After insertion of the rotor shaft, the projection 684 is displaced outwardly, and therefore no longer projects, or only slightly projects, into through-passage 630.

Thus, after the insertion of the shaft 40, the clamping member 694 is also permanently subjected to pressing force F in the direction of pocket 614 and is, by reason of this permanent force application, urged in the direction of pocket 614, as indicated by arrow 794. Due to this material displacement in the direction 794, there arises, in the pocket 614, a bulge 784 aligned in the direction 794 which exerts a predetermined consistent clamping force F on the rotor magnets, so that rotor magnet 224 is clamped in the pocket 614. In this context, the rotor shaft 40 has dimensions selected to facilitate the exertion of the predetermined force F via the clamping member 694 and the bulge 784 on the rotor magnets 224.

The rotor shaft (here simultaneously the jamming element) 40 exerts, on one hand, a force F on the clamping member 694, which presses the clamping member 694 against the magnets 224. On the other hand, the rotor shaft, due to its placement in through-passage 630, is hindered from carrying out any movement away from rotor magnets 224. Rotor shaft 40 thus, by its placement in the opening 244, engages (in all directions) against lamination stack 200.

Preferably, during the material displacement, there occurs an at-least-partially inelastic or plastic deformation, in which the clamping member 694 is transformed at least partly inelastically by the clamping element 40 from a first geometric form into a second geometric form, and is maintained permanently in this second form by the jamming element 40. Illustratively, clamping member 694, which is shaped like a straight crossbar, is pressed radially outward by at least partly inelastic deformation by the jamming element 40 and is kept permanently in this form by jamming element 40. The at least partially inelastic or plastic deformation is apparent from the fact that the clamping member 694 does not completely rebound after removal of jamming element 40.

Preferably, rotor shaft 40 is form-lockingly secured within opening 244, at least with respect to displacement perpendicular to rotation axis 43.

Rotor shaft 40 preferably has a greater hardness than lamination stack 200 so that, during insertion or pressing into the opening 244, the shaft is not destroyed.

It should be noted that clamping member 694 is preferably configured such that the rotor magnets 224 are clamped into pocket 614 with the associated clamping force F only segmentally. To achieve this, the clamping member 694 and the projection 684 are not formed along the entire length of the through-passage 630, i.e. not on all lamination plates 201, 202 of the lamination stack 200, but rather only segmentally. For example, the clamping member 694 and the projection 684, as well as the cutouts 671, 672, can be formed only on a predetermined number of the plurality of rotor lamination plates 201, 202 of FIG. 3. Thus, by appropriate specification of the respective geometries of the clamping member 694 and/or of the predetermined number of the plurality of rotor plates 201, the pressing force F of the clamping member 694 can be varied. This has the advantage that the clamping members 694 get protected by the interior rotor plates 202 against breakaway in the axial direction.

It should also be noted that the aforementioned material driving can be accomplished before the rotor shaft is permanently secured in the through-opening 630. For this purpose, an insertion punch (800 in FIG. 5) can be used, as described below with reference to FIG. 5. Alternatively, the pressing out of the clamping members 690 can also be accomplished directly by the shaft 40.

In case of a solid configuration of lamination stack 200, without the clamping members 691 to 698, and with a circular internal opening of lamination stack 200, the pressing in of rotor shaft 40 would lead to a minimal movement of lamination stack 200 in its inner region, of about 10-20 micrometers. From this, the permanent magnets 221 through 228, displaced by rotor shaft 40, and by the lamination stack material immediately surrounding the permanent magnets, would receive nothing, and a clamping effect would not be possible.

Figure 5:
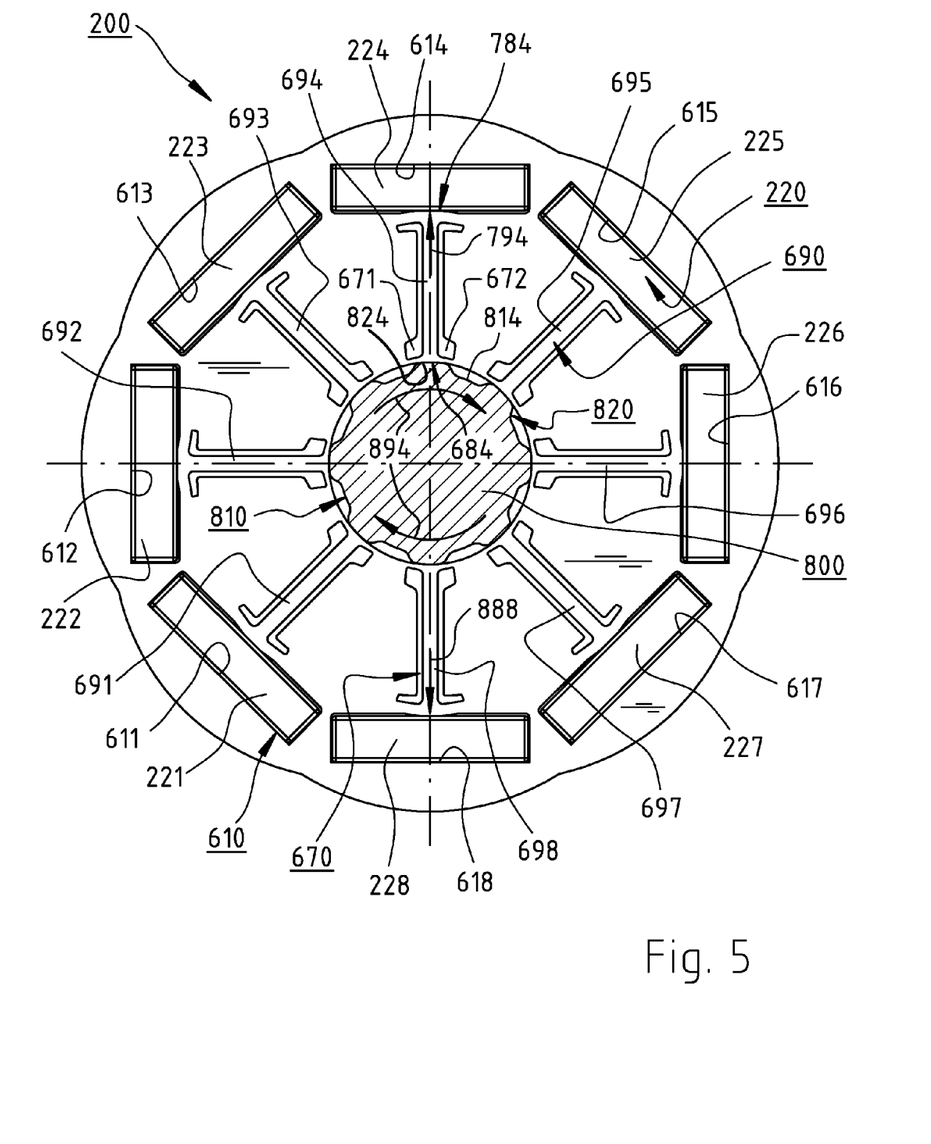
FIG. 5 a plan view of the lamination stack and associated rotor magnets from FIG. 2, with a compression mandrel.

FIG. 5 shows the lamination stack 200 of FIG. 2 with a compression punch or mandrel 800, according to an embodiment, after a displacement of material. This compression punch has, along its axial dimension, longitudinal grooves or valleys 810, between which are defined displacing ridges 820. Preferably, an identical plurality of longitudinal valleys and ridges are provided, corresponding to a respective plurality of clamping members. For simplicity and clarity of illustration, only two exemplary longitudinal valleys 812, 814 are labeled, between which a displacing ridge 824 is defined.

It is hereby noted that the compression mandrel 800 is only formed, for purpose of example, as a separate component. The compression mandrel can, alternatively, be the rotor shaft of FIG. 1 or at least represent a segment thereof, or the rotor shaft insertion end can be formed with a chamfer, taper, or frusto-conical portion (45 in FIG. 1) in order to enable a gentle pressing out of the clamping members 691 through 698. For example, the chamfer 45 can have an angle of 5° and an axial length of 2 mm, although this will naturally depend upon the geometry of the lamination stack.

In order to accomplish the material displacement described above with reference to FIG. 4, the compression mandrel 800 is initially introduced into through-passage 630 in such a way that the longitudinal valleys 810 and the clamping members 690 align. For example, the mandrel 800 is inserted into through-passage 630 with the clamping member 694 engaging in the longitudinal valley 814.

Then the compression mandrel 800 is rotated, e.g. in the direction of arrow 894, so that ridges 820 drive the plurality of projections 680 in the direction of the corresponding clamping members 690, and thus these in the direction of the corresponding recesses or pockets 610. In this manner, the displacement (described with reference to FIG. 4) of material of clamping members 694 in the direction of arrow 794 occurs. A further displacement of material is, for example, shown at clamping member 698, which is displaced in the direction of arrow 888 toward pocket 618. Subsequently, the compression mandrel 800 can be removed from through-passage 630 and replaced with the rotor shaft 40 of FIG. 1. This thereby takes over function of the jamming element as described with reference to FIG. 4.

Figure 6:
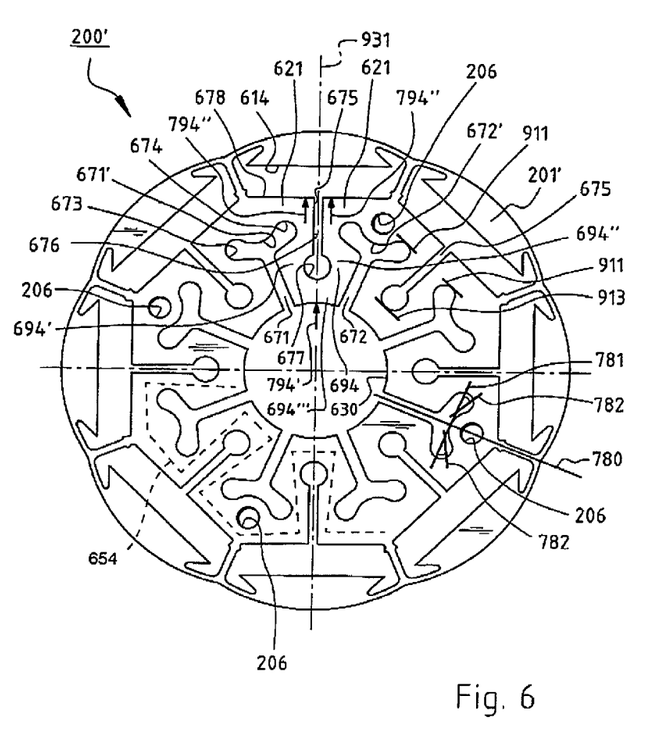
FIG. 6 a plan view of a second embodiment of a rotor plate.

FIG. 6 illustrates a second embodiment of a lamination stack 200' with a rotor plate 201', in which lamination stack 200' can be used for an internal rotor motor 100 as shown, e.g. in FIG. 1, and which corresponds to the basic principle of lamination stack 200 of FIG. 2.

There are provided pockets 614 for the rotor magnets 200 shown in FIG. 1, along with a plurality of clamping members 694, which each have two cutouts 671, 672 in rotor plate 201'.

Upon pressing in of the shaft 40 (shown in FIG. 1) into the lamination stack 200', clamping member 694 is subjected to an outwardly-directed force indicated by an arrow 794', and this force is further transmitted by clamping member 694 (possibly after deformation thereof) to a rotor magnet 200 arranged in pocket 614. This is indicated by arrow 794".

The radially outer portion 671' of cutout 671 and the radially outer portion 672' of cutout 672 are each preferably T-shaped and each have two leg- or socket-shaped regions 673, 674. The shape of region 672' with the leg-shaped regions 673, 674 can also be called "bone-shaped" and is reminiscent of the illustration of bones on pirate flags. The leg-shaped regions 673, 674 preferably have a curved contour, in order, when rotor plate 201' is deformed, to better distribute the stresses.

Preferably, the leg-shaped regions 673,674 have peripheries which curve out from the middle, so that, with respect to a hypothetical tangent line 781 running perpendicular to a radial axis 780 through the middle of cutout 671, the peripheries angle out, as indicated by straight lines 782. See FIG. 6, at lower right.

Preferably, cutouts 671, 672 transition directly into through-opening 630, in order, in this region, to hinder as little as possible a radial movement of clamping member 694, and not to redirect the forces in a wrong direction. However, having a thin connecting bridge is also possible.

Preferably, cutouts 671, 672 are each centrally located between two adjacent clamping members 694, thereby defining both clamping members 694. Preferably cutouts 671, 672 are each configured symmetrically about a respective radially-extending axis of symmetry 780, in order to behave the same in both directions.

Preferably, a cutout 675 is provided on the radially inner periphery of each pocket 614 for a rotor magnet 220. Cutout 675 extends from pocket 614 (or from the rotor magnet 220 located therein) in a direction toward shaft 40 (FIG. 1), i.e. toward the inside. Cutout 675 thus acts as an interruption or division of the radially inner periphery 678 of the pocket 614. Thus are created, adjacent pocket 614, two legs 694', 694" which are each located on a respective flank of cutout 675, 677. Preferably, these two legs 694', 694" are connected with each other in a region 694''' on the radially inner side of member 694, in order, when shaft 40 applies force to clamping members 694, to keep legs 694', 694" from moving into the space of cutouts 671, 672 since that would lead to reduction of the clamping force on the rotor magnets 220. The configuration of legs 694', 694" and the radially-inwardly-located connecting region 694''' can also be called "U-shaped" or "loop-shaped."

The maximum radial extent of cutouts 671, 672 toward the outside is designated 911 in FIG. 6; it has a first and a second spacing from the rotation axis (centrum), i.e. lies at a first and a second radius. The maximum radial extent of cutout 675 toward the inside is designated 913; it has a third spacing from the rotation axis, i.e. lies at a third radius. Preferably, the first and/or second spacings are greater than the third spacing, in order to improve a combined effect of the cutouts 671, 672 and the cutout 675. Expressed another way, the cutouts 671, 672 and the cutouts 675 are interdigited, i.e. each pair of cutouts 671, 672 surrounds a respective cutout 675. One can also say that the rotor plate 201', in the region between pocket 614 and through-passage 630, has a meander-shaped course 654, namely runs in this area from through-passage 630 to a pocket 614, then back to through-passage 630, then to the next pocket 614, and so forth.

According to an embodiment of clamping member 694 without a cutout 675, as shown for example in FIG. 2, application of force, by clamping members 694 to the rotor magnets 220, leads to the radially inner periphery 678 of pocket 614 getting curved, and thereby large forces in the circumferential direction arise, which do not contribute significantly to the securing of rotor magnets 220.

Providing the cutout 675 leads, upon movement of the clamping members 694 toward the rotor magnets 220, to the thus-arising curvature being de-stressed, thanks to the subdivision of the radially inner side 678, rather than to warping of the radially inner side 677, and the forces in the circumferential direction are reduced, the pressure of the rotor plate 201' against the rotor magnets 220 being increased. It is also possible, in the rotor plate 201 of FIG. 2, to provide such a cutout 675.

Preferably, the cutout 675 runs, from pocket 614, in a first portion 676, with a longitudinal extent in the radial direction.

Preferably, at a radially inner region of the first portion 676, cutout 675 has a widened second portion 677. Preferably, this second portion 677 is curved, preferably circular or ellipsoidal. The second portion 677 enables, on one hand, a better distribution of the large forces or bending arising in this region, as was also ascertained by FEM (Finite Element Method) calculations and, on the other hand, it achieves a certain spring effect. The radial extension of second portion 677 in case of large forces, which for example can arise with rotor magnets 220 of relatively high thickness, is minimized; the clamping member 694 can also broaden. The cutouts 673, 674, 677 can thus also be called "force-limiting cutouts" or "force-limiting elements."

The magnets used for internal rotors are, for example, made by sawing, and the overall costs go higher, the smaller the specified tolerances for the dimensions of the magnets are. Therefore, magnets are typically marketed with a relatively broad "tolerance window" of about $1/10$ mm, and this causes difficulty during assembly. Thus, one must make sure, on the one hand, that when clamping the thinnest magnet, one exerts a sufficient force on it and, on the other hand, one must make sure when clamping the thickest magnet, that the magnet doesn't break, due to application of too-high clamping force. This is achieved by the above-described embodiments.

The above-described knubs 206 for stack assembly are shown. The knubs 206 serve to inter-engage the rotor plates 201', 202' of the lamination stack 200 but have no direct function for clamping of the rotor magnets 220. The necessary space must be taken into account, in designing the plate configuration of each rotor plate 201'.

Figure 7:
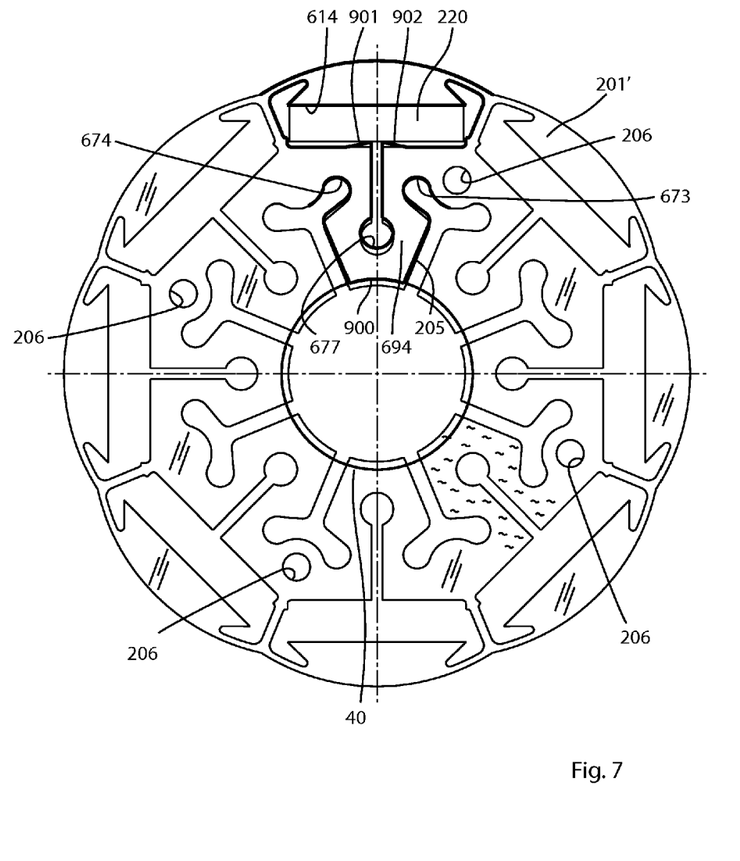
FIG. 7 a schematic view of deformation of the rotor plate of FIG. 6.

FIG. 7 shows, in a schematic illustration, on one hand, the rotor plate 201' of FIG. 6, before the insertion of shaft 40, and on the other hand, with a bolder line 205, shows the shaft 40 and the deformation of the rotor plate 201' adjacent the clamping member 694. The flexing of a further clamping member 694 is indicated, at lower right, by a plurality of small tilde symbols.

Due to the pressing in of rotor shaft 40, the clamping element 694 is permanently subjected to an outward force and is prevented from springing back. At 900, a relative movement of clamping member 694, radially outward with respect to its original position, is recognizable. The cutout 677 is somewhat compressed in the radial direction, and the legs 673, 674 are likewise somewhat compressed in the radial direction, in order to avoid a too-great force on the rotor magnets 220. The movement of clamping member 694 leads at positions 901, 902, to a displacement of clamping member 694 toward the rotor magnets 220 and thus to application of force; preferably, rotor magnet 220 is not in contact with clamping member 694 over the entire length of the magnet's inward-facing surface.

Figure 8:
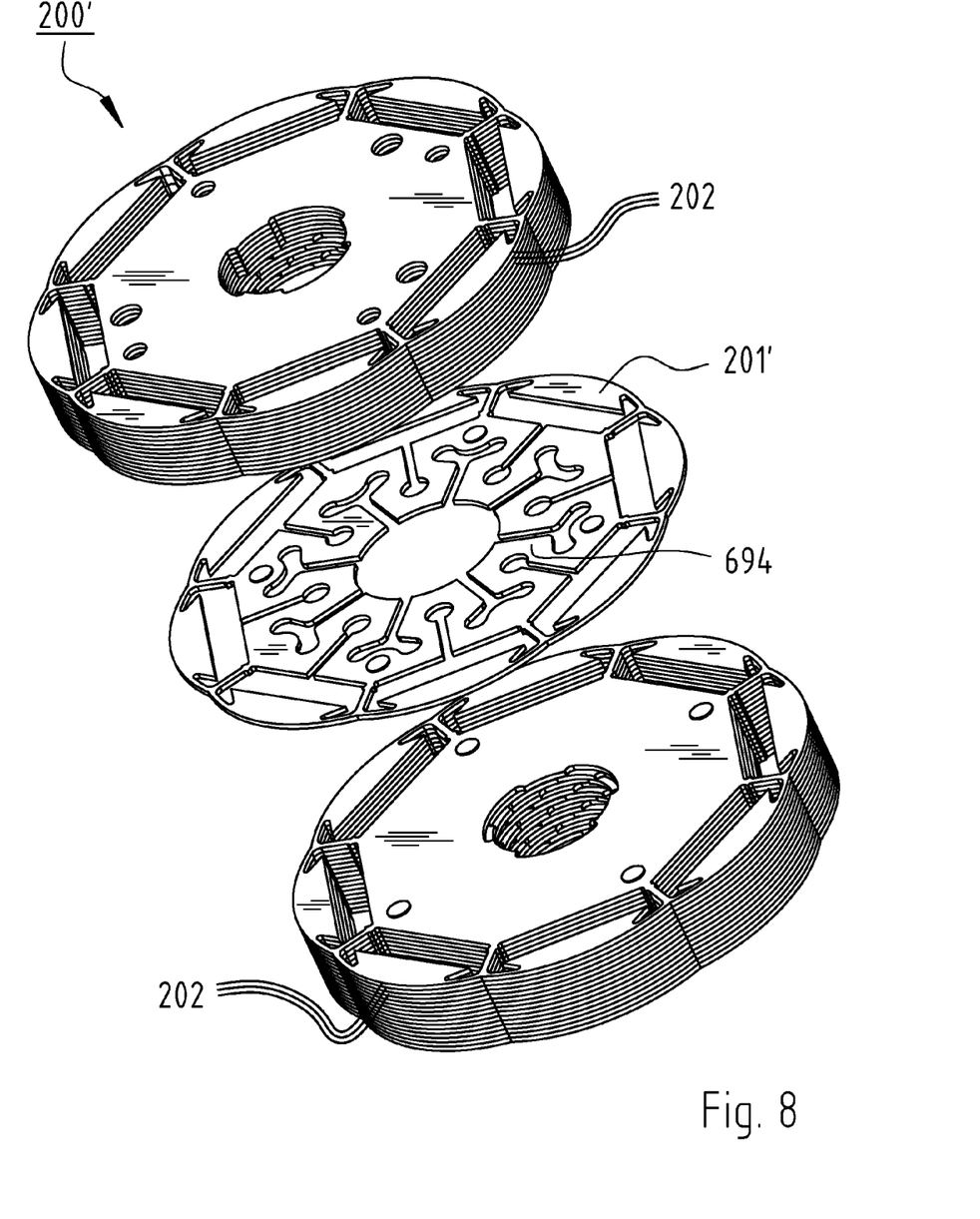
FIG. 8 an exploded perspective view of a lamination stack with the rotor plate of FIG. 6.

FIG. 8 shows lamination stack 200' with a single rotor plate 201' and the remaining rotor plates 202, which can correspond to those of the first embodiment. The view is partly an exploded view and, in the completed lamination stack 200', preferably a rotor plate 202 is provided on each side of rotor plate 201', in order to hinder an axial deviation of clamping members 694.

As already described with reference to the first embodiment, multiple rotor plates 201' can be provided, in order to achieve sufficient securing of rotor magnets 220. This is particularly dependent upon the geometry of the lamination stack 200' and upon the maximum loads to be expected in the respective context of installation.

Figure 9:
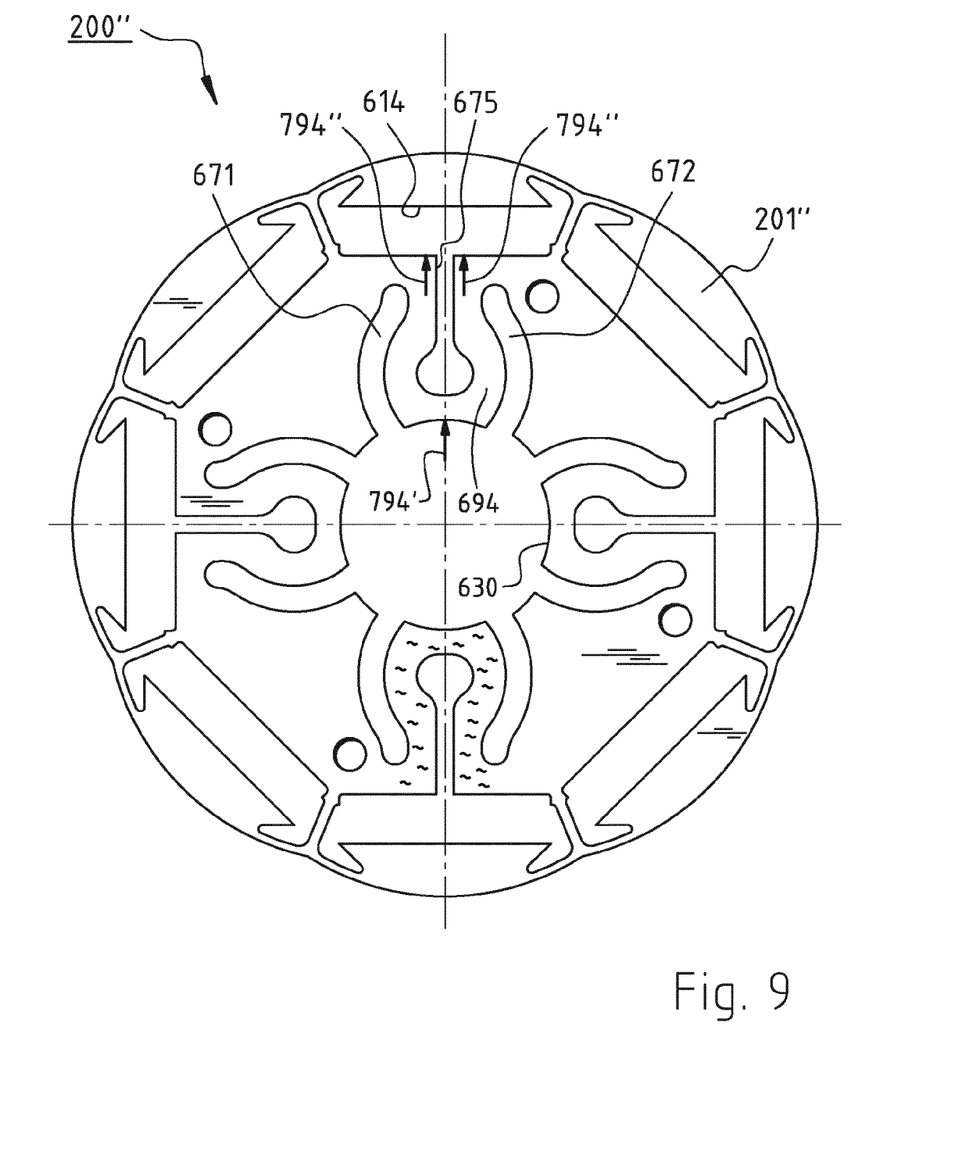
FIG. 9 a plan view of a third embodiment of a rotor plate.

FIG. 9 shows a third embodiment of a lamination stack 200' with a rotor plate 201" which can be used for an internal rotor motor, as shown for example in FIG. 1.

The basic principle of rotor plate 201" resembles the rotor plate 201 of the first embodiment, and particularly resembles the rotor plates 201' of the second embodiment.

However, by contrast, rotor plate 201" does not have a clamping member 692, 694 for each rotor magnet, but rather only for a portion of the rotor magnets, here for every second rotor magnet. This has the advantage that the individual clamping member 694 can exert a stronger force on the associated rotor magnets 220 than according to the second embodiment, since the force created by pressing in of the shaft 40 is distributed across fewer clamping members 694 and the clamping members can also be made larger. Such a configuration, according to which a rotor plate clamps only a portion of the rotor magnets, can also be provided together with the first and second embodiments. The flexing of a further clamping member 694 is indicated at bottom by a plurality of small wavy lines (tildes).

To assure the clamping of all rotor magnets 220, a second rotor plate 201" can be provided, rotated 45° with respect to the first rotor plate 201', thereby clamping the remaining rotor magnets 220. Rotor plate 201" need not provide a clamping element for every second rotor magnet; rather, it could instead be for every third rotor magnet or there could be a clamping element for just one rotor magnet.

The clamping members 694 are preferably each associated with one cutout 675 and two cutouts 671, 672. Preferably, cutout 675 connects with pocket 614 and cutouts 671, 672 connect with through-passage 630.

Figure 10:
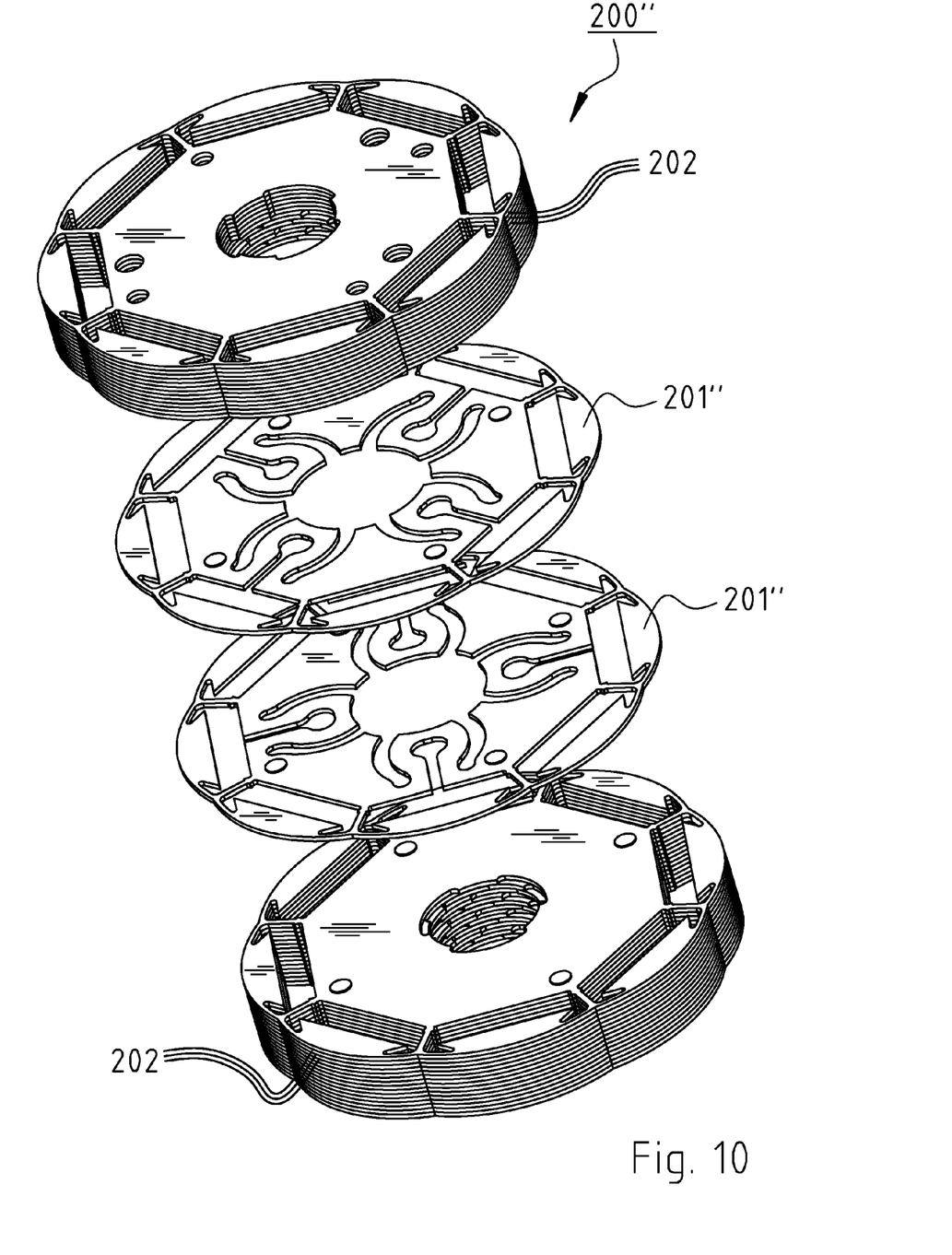
FIG. 10 an exploded perspective view of a lamination stack with the rotor plate of FIG. 9.

FIG. 10 shows the lamination stack 200" with the rotor plate 201" and the remaining rotor plate 202, which can correspond to those from the first embodiment. The illustration is an exploded view, and in the finished lamination stack 200", on both sides of rotor plate 201', preferably at least one rotor plate 202 or one rotor plate 201" is provided, in order to hinder an axial deviation of the clamping members. Also, further rotor plates 201" can be provided, in order to achieve a sufficient fixation of the rotor magnets 220.

Naturally, within the scope of the present invention, many variations and modifications are possible.

Thus, in place of the rolling bearings, one could use, for example, a sintered bearing.

An advantage of the invention is the result, that a movement of the clamping member away from the rotor magnet is hindered by the jamming element, and a movement of the jamming element away from the rotor magnets is hindered by the lamination stack. Any forces tending to move the clamping members away from the rotor magnets are thus fed, via the clamping members, into the lamination stack, without any spring action being necessary for it to happen.

The internal rotors shown have an outer diameter (at maximum extent) approximating 35 mm, and the associated external stator has an outer diameter of about 60 mm. Of course, larger or smaller motor sizes are possible.

What is claimed is:

1. An electric motor, comprising:
   an external stator (28);
   an internal rotor (150), mounted for rotation within said external stator (28), having a lamination stack (200; 200'; 200") composed of a plurality of rotor lamination plates (201, 202; 201', 201") and in which at least one first cutout or pocket (614) and a second cutout (630) are formed, said first cutout or pocket (614) being associated with a rotor magnet (224) arranged therein;
   said second cutout (630) being associated with a jamming element (40) arranged therein;
   a clamping member (692, 694) being arranged between the first cutout (614) and the second cutout (630);
   at least one predetermined amination plate (201; 201'; 201") of the lamination stack (200; 200'; 200") having, in order to form the clamping member (692, 694), along the extent of the clamping member, on a first side, a first recess (671) at least partway along the clamping member (692, 694) and, on a second side opposite said first side, a second recess (672) at least partway along the clamping member (692-694), said first recess (671) and second recess (672) extending outwardly from the second cutout (630), outside of said jamming element (40), said first recess (671) being open to the second cutout (630),
   the jamming element (40) and the second cutout (630) being configured such that support of the jamming element (40) on the lamination stack (200; 200'; 200") is enabled;
   a force (F) is applied to the clamping member (692, 694) in a direction toward the rotor magnets (224), so that the rotor magnets (224) are thereby clamped into said first cutout or pocket (614);
   the lamination stack (200; 200'; 200") is formed with a through-passage (630) for receiving a shaft (40), said second cutout (630) serving as said through-passage (630); and
   said shaft (40) serves as said jamming element (40).

2. The electric motor according to claim 1, wherein the clamping member (692, 694) is shaped so as to enable a radially outwardly directed displacement of the clamping member (694) by the jamming element (40).

3. The electric motor according to claim 1, wherein the rotor magnet (224) has a radially inner surface and wherein the clamping member (692, 694) is shaped so that it clamps the rotor magnet (224) into the first pocket (614) only at a portion of said radially inner surface.

4. The electric motor according to claim 1, wherein the jamming element (40) is composed of a harder material than that of the lamination stack (200; 200'; 200").

5. The electric motor according to claim 1, wherein the jamming element (40) is formed with a taper (45), in order to facilitate introduction into said second cutout (630).

6. The electric motor according to claim 1, wherein the clamping member (692, 694) has a projection (684) directed toward said second cutout (630).

7. The electric motor according to claim 1, wherein the clamping member (694) extends from the second cutout (630) to the first cutout or pocket (614).

8. The electric motor of claim 1, wherein said first and second recesses (671, 672) run parallel to each other, at least partway along.

9. The electric motor of claim 1, wherein said first and second recesses (671, 672) run radially.

10. The electric motor of claim 1, wherein the first and second recesses (671, 672) each run so curvingly from a region between the first cutout (614) and the second cutout (630), to the first cutout (614) and to the second cutout (630), that they (671, 672), at least in part, approach toward each other.

11. The electric motor according to claim 1, wherein said first and second recesses (671, 672) are each T-shaped at their radially outer portions.

12. The electric motor of claim 1, wherein a third recess (675) is provided, which extends from said first cutout (614) inwardly.

13. The electric motor of claim 12, wherein the third recess (675) has a first portion (676) which is elongated and which extends from said first cutout (614) in a radially inward direction.

14. The electric motor of claim 13, wherein the third recess (675) is formed, at an inner end of said first portion (676), with a second portion (677) which is wider than said first portion (676).

15. The electric motor according to claim 12, wherein a maximum outward radial extent (911) of the first recess (671) has a first spacing from the rotation axis;
a maximum outward radial extent of the second recess (672) has a second spacing from the rotation axis; and
a maximum inward radial extent of the third recess (675) has a third spacing from the rotation axis; and
said first spacing and said second spacing are each larger than said third spacing.

16. The electric motor according to claim 12, wherein the rotor plate (201'), in a region between the first cutout (614) and the second cutout (630), has a meandering course (654).

17. The electric motor according to claim 1, wherein a clamping member (692, 694) is connected, at its end adjacent the first cutout (614), via at least one bridge (621) with remaining portions of the respective rotor lamination plate (201, 201', 201") and wherein the first recess (671) or the second recess (672) have, adjacent said at least one bridge (621), an angled-away portion (671', 672').

18. The electric motor according to claim 1, wherein the clamping member (692, 694) is connected, at its end adjacent the second cutout (630), via at least one bridge (622) with remaining portions of the respective rotor lamination plate (201, 201', 201") and wherein the first recess (671) or the second recess (672) have, adjacent said at least one bridge (622), an angled-away portion (671', 672').

19. The electric motor according to claim 1, wherein a predetermined rotor plate (201, 201', 201") has a number N of first pockets (614) for receiving a number N of rotor magnets (220) and wherein the predetermined rotor plate (201, 201', 201") has a number K of clamping members (692, 694), with N being equal to K.

20. The electric motor according to claim 1, having at least two predetermined rotor plates (201, 201', 201") which each have a number N of first pockets (614) for receiving a number N of rotor magnets (220),
and wherein a number K of clamping members (692, 694) are provided, where N is greater than 1, and
where K has a value which falls in the range from 1 to N−1.

21. An electric motor, comprising:
an external stator (28);
an internal rotor (150), mounted for rotation within said external stator (28), having a lamination stack (200; 200'; 200") composed of a plurality of rotor lamination plates (201, 202; 201', 201") and in which at least one first cutout or pocket (614) and one second cutout (630) are formed;
said first cutout or pocket (614) being associated with a rotor magnet (224) arranged therein;
said second cutout (630) being associated with a jamming element (40) arranged therein;
a clamping member (692, 694) being arranged between the first cutout (614) and the second cutout (630);
at least one predetermined lamination plate (201; 201'; 201") of the lamination stack (200; 200'; 200") having, in order to form the clamping member (692, 694), along the extent of the clamping member, on a first side, a first recess (671) at least partway along the clamping member (692, 694) and, on a second side opposite said first side, a second recess (672) at least partway along the clamping member (692, 694),
wherein the clamping member (692, 694) has a projection (684) directed toward said second cutout (630), the projection extending into the second cutout of the lamination stack, in order to work together with the jamming element, the clamping member (692, 694) extending from the second cutout (630) to the first cutout (614) and having a length, the first recess (671) and the second recess (672) each extending over at least 70% of the length of the clamping member (692, 694),
the jamming element (40) and the second cutout (630) being configured such that support of the jamming element (40) on the lamination stack (200; 200'; 200") is enabled;
a force (F) is applied to the clamping member (692, 694) in a direction toward the rotor magnets (224) so that the rotor magnets (224) are thereby clamped into said first cutout or pocket (614);
the lamination stack (200; 200'; 200") is formed with a through-passage (630) for receiving a shaft (40), said second cutout (630) serving as said through-passage (630); and
said shaft (40) serving as said jamming element (40).

22. The electric motor according to claim 21, wherein, to each of the at least one first cutout or pocket (614), there is provided a corresponding clamping member (692, 694) formed with a projection (684) directed toward said second cutout (630), the projection extending into the second cutout of the lamination stack.

23. The electric motor according to claim 22, wherein the shaft (40) has a cylindrical portion, the projection being located outside the cylindrical portion.

24. The electric motor according to claim 21, wherein the shaft (40) has a cylindrical portion, the projection being located outside the cylindrical portion.

* * * * *

UNITED STATES PATENT AND TRADEMARK OFFICE
CERTIFICATE OF CORRECTION

PATENT NO.       : 9,979,246 B2
APPLICATION NO.  : 14/778911
DATED            : May 22, 2018
INVENTOR(S)      : Sergej Helbling Page 1 of 1

It is certified that error appears in the above-identified patent and that said Letters Patent is hereby corrected as shown below:

On the Title Page

Column 1, after (73) Assignee: delete "EMB-PAPST" and insert --EBM-PAPST--

Signed and Sealed this
Twelfth Day of February, 2019

Andrei Iancu
*Director of the United States Patent and Trademark Office*